United States Patent
Yang et al.

(10) Patent No.: US 11,432,277 B2
(45) Date of Patent: Aug. 30, 2022

(54) TECHNIQUES FOR DETERMINING RESOURCES FOR TRANSMITTING WIRELESS COMMUNICATIONS

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/940,127

(22) Filed: Jul. 27, 2020

(65) Prior Publication Data

US 2021/0068083 A1   Mar. 4, 2021

Related U.S. Application Data

(60) Provisional application No. 62/891,929, filed on Aug. 26, 2019.

(51) Int. Cl.
*H04W 4/00* (2018.01)
*H04W 72/04* (2009.01)

(52) U.S. Cl.
CPC ..... *H04W 72/042* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 9,220,091 B2 * | 12/2015 | Yang | H04L 1/0026 |
| 9,584,265 B2 * | 2/2017 | Yang | H04W 72/02 |
| 10,375,681 B2 * | 8/2019 | Papasakellariou | H04L 1/18 |
| 10,499,384 B2 * | 12/2019 | He | H04L 5/0055 |
| 2015/0181566 A1 * | 6/2015 | Stopler | H04W 72/0413 370/329 |
| 2016/0066282 A1 * | 3/2016 | Ouchi | H04L 5/00 455/522 |
| 2018/0175993 A1 * | 6/2018 | Onggosanusi | H04B 7/0486 |
| 2018/0227908 A1 * | 8/2018 | Wang | H04L 5/0007 |
| 2019/0037586 A1 * | 1/2019 | Park | H04L 1/0031 |
| 2019/0053226 A1 * | 2/2019 | Xiong | H04L 5/0091 |
| 2019/0059013 A1 * | 2/2019 | Rahman | H04B 7/0695 |
| 2019/0199477 A1 * | 6/2019 | Park | H04L 1/0067 |
| 2019/0253986 A1 * | 8/2019 | Jeon | H04W 72/042 |
| 2019/0261407 A1 | 8/2019 | Irukulapati et al. | |
| 2019/0363843 A1 * | 11/2019 | Gordaychik | H04L 1/1854 |

(Continued)

OTHER PUBLICATIONS

International Search Report and Written Opinion—PCT/US2020/043911—ISA/EPO—dated Nov. 5, 2020.

*Primary Examiner* — Clemence S Han
(74) *Attorney, Agent, or Firm* — Arent Fox LLP

(57) ABSTRACT

Aspects described herein relate to determining a beta offset for determining a number of shared channel resources to be used to transmit uplink control information, where a downlink control information indicating a resource grant for the shared channel resources does not include at least an indication of selection of a dynamic beta offset. A shared data channel including the uplink control information can be generated based at least in part on the beta offset, and transmitted over the shared data channel resources.

16 Claims, 7 Drawing Sheets

(56) References Cited

U.S. PATENT DOCUMENTS

| | | | | |
|---|---|---|---|---|
| 2019/0373588 A1* | 12/2019 | Bae | ........................ | H04W 76/27 |
| 2019/0394758 A1* | 12/2019 | Cheng | .................... | H04L 5/0055 |
| 2020/0120584 A1* | 4/2020 | Yi | ......................... | H04L 5/0053 |
| 2020/0163155 A1* | 5/2020 | Lee | ........................ | H04L 1/0026 |
| 2020/0280992 A1* | 9/2020 | Takeda | .................. | H04W 80/08 |
| 2020/0288458 A1* | 9/2020 | Takeda | ............... | H04W 72/0413 |
| 2020/0296715 A1* | 9/2020 | Wang | .................... | H04L 1/0038 |
| 2020/0344752 A1* | 10/2020 | Li | .......................... | H04W 72/10 |
| 2020/0351861 A1* | 11/2020 | Mukherjee | ............ | H04L 5/0053 |
| 2020/0374917 A1* | 11/2020 | Takeda | .................. | H04L 5/0044 |
| 2021/0045181 A1* | 2/2021 | Li | .......................... | H04L 5/0005 |
| 2021/0068100 A1* | 3/2021 | Takeda | .................. | H04W 72/04 |
| 2021/0168794 A1* | 6/2021 | Zhang | ............... | H04W 72/0413 |

* cited by examiner

TECHNIQUES FOR DETERMINING RESOURCES FOR TRANSMITTING WIRELESS COMMUNICATIONS

CLAIM OF PRIORITY UNDER 35 U.S.C. § 119

The present application for patent claims priority to Provisional Application No. 62/891,929, entitled "TECHNIQUES FOR DETERMINING RESOURCES FOR TRANSMITTING WIRELESS COMMUNICATIONS" filed Aug. 26, 2019, which is assigned to the assignee hereof and hereby expressly incorporated by reference herein for all purposes.

BACKGROUND

Aspects of the present disclosure relate generally to wireless communication systems, and more particularly, to determining resources over which to transmit control information.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, user equipment (UE) can be configured to communicate control information over a number of data (e.g., non-control) channel resources. The UE can be configured with a beta offset used to determine the data channel resources over which to transmit the control information, and can multiplex control information with data over the determined data channel resources. Currently, the UE can be configured with either a semi-static beta offset or a set of dynamic beta offsets, from which one dynamic beta offset can be specified in corresponding downlink control information (DCI), but not both.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining a beta offset for determining a number of shared channel resources to be used to transmit uplink control information, where a downlink control information indicating a resource grant for the shared channel resources does not include at least an indication of selection of a dynamic beta offset, generating, based at least in part on the beta offset, a shared data channel including the uplink control information, and transmitting the shared data channel over the shared data channel resources.

In another example, a method of wireless communication is provided that includes receiving a configuration of a set of multiple dynamic beta offsets, determining a downlink control information indicating a resource grant for shared channel resources does not include at least an indication of selection of one of the multiple dynamic beta offsets, and generating, based at least in part on the determining, a shared data channel not including uplink control information, and transmitting the shared data channel over the shared data channel resources.

In another example, a method of wireless communication is provided that includes determining a beta offset for determining a number of shared channel resources to be used to transmit uplink control information, where a downlink control information indicating a resource grant for the shared channel resources does not include at least an indication of selection of a dynamic beta offset, and receiving, based at least in part on the beta offset, a shared data channel including the uplink control information.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In an aspect, an apparatus for wireless communication is provided that includes a transceiver, a memory configured to store instructions, and one or more processors communicatively coupled with the transceiver and the memory. The one or more processors are configured to determine a beta offset for determining a number of shared channel resources to be used to transmit uplink control information, where a downlink control information indicating a resource grant for the shared channel resources does not include at least an indication of selection of a dynamic beta offset, generate, based at least in part on the beta offset, a shared data channel including the uplink control information, and transmit the shared data channel over the shared data channel resources.

In another aspect, an apparatus for wireless communication is provided that includes a transceiver, a memory configured to store instructions, and one or more processors communicatively coupled with the transceiver and the memory. The one or more processors are configured to determine a beta offset for determining a number of shared channel resources to be used to transmit uplink control information, where a downlink control information indicating a resource grant for the shared channel resources does not include at least an indication of selection of a dynamic beta offset, and receive, based at least in part on the beta offset, a shared data channel including the uplink control information.

In an aspect, an apparatus of wireless communication. The apparatus includes means for determining a beta offset for determining a number of shared channel resources to be used to transmit uplink control information, where a downlink control information indicating a resource grant for the shared channel resources does not include at least an indication of selection of a dynamic beta offset, means for generating, based at least in part on the beta offset, a shared data channel including the uplink control information, and means for transmitting the shared data channel over the shared data channel resources.

In an aspect, an apparatus of wireless communication is provided that includes means for determining a beta offset for determining a number of shared channel resources to be used to transmit uplink control information, where a downlink control information indicating a resource grant for the shared channel resources does not include at least an indication of selection of a dynamic beta offset, and means for receiving, based at least in part on the beta offset, a shared data channel including the uplink control information.

In an aspect, a computer-readable medium including code executable by one or more processors for wireless communication is provided. The code includes code for determining a beta offset for determining a number of shared channel resources to be used to transmit uplink control information, where a downlink control information indicating a resource grant for the shared channel resources does not include at least an indication of selection of a dynamic beta offset, generating, based at least in part on the beta offset, a shared data channel including the uplink control information, and transmitting the shared data channel over the shared data channel resources.

In an aspect, a computer-readable medium including code executable by one or more processors for wireless communication is provided. The code includes code for determining a beta offset for determining a number of shared channel resources to be used to transmit uplink control information, where a downlink control information indicating a resource grant for the shared channel resources does not include at least an indication of selection of a dynamic beta offset, and receiving, based at least in part on the beta offset, a shared data channel including the uplink control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
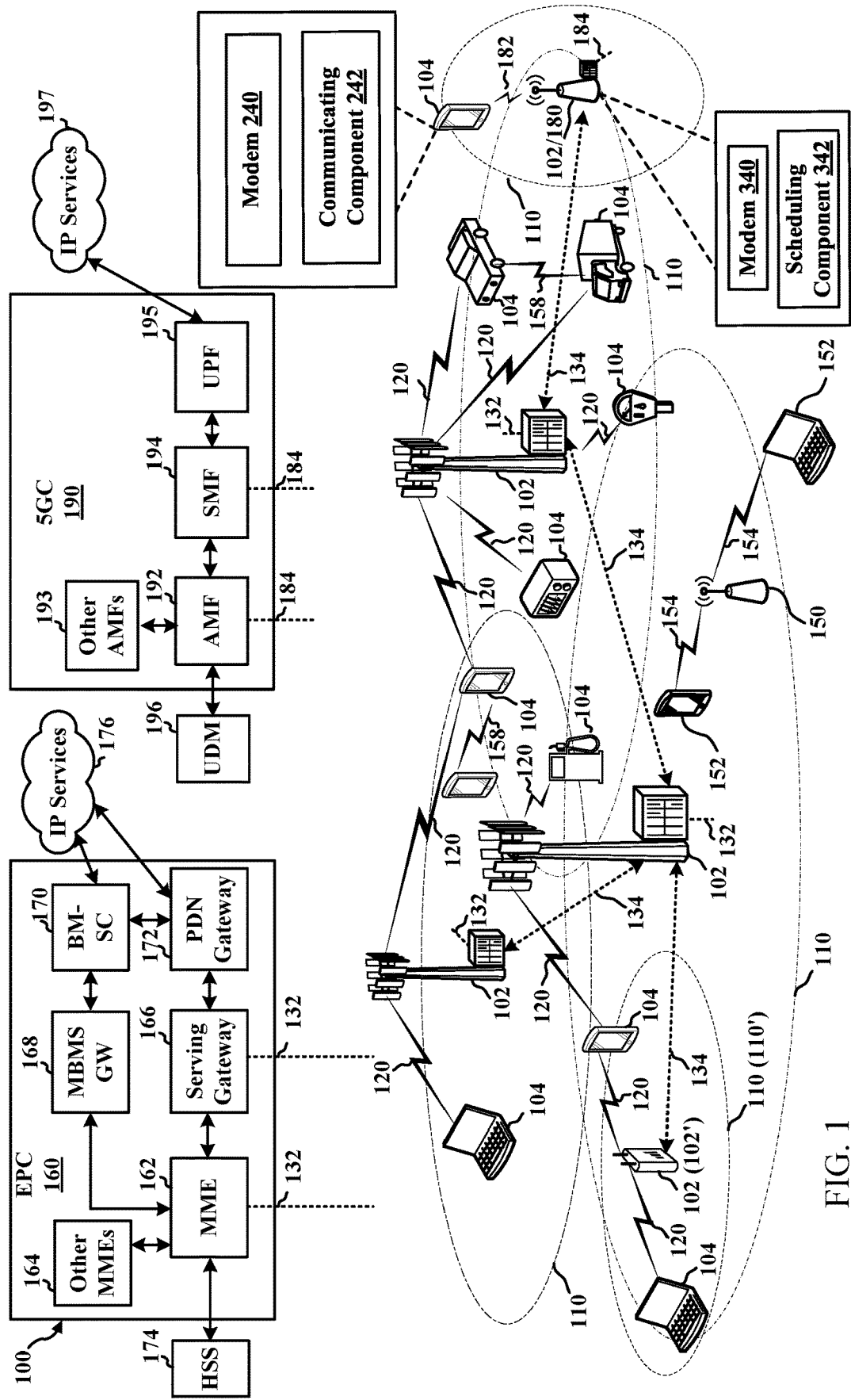
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining resources over which to transmit control information in wireless communications. For example, the resources can be determined as data (e.g., non-control) channel resources over which to transmit control information. In an example, the control information transmitted over the data channel resources can be multiplexed with data (e.g., non-control data). In wireless communication technologies such as fifth generation (5G) new radio (NR), user equipment (UE) can be configured to transmit uplink control information (UCI) over a physical uplink control channel (PUCCH) intended for control information communication or over a physical uplink shared channel (PUSCH) intended for data (e.g., non-control data), where the control information can be information that facilitates establishing the data channel (e.g., PUSCH) and/or can include other parameters for transmitting data over the data channel. Where UCI is transmitted over PUSCH, the UCI may or may not be multiplexed with data for transmitting over the PUSCH resources. In this example, the UE can be configured (e.g., by a base station) with parameters for determining the PUSCH resources over which to transmit the UCI.

For example, the UE can be configured with a beta offset used in determining the PUSCH resources, which may be based on a formula. In one specific example, for hybrid automatic repeat/request (HARD)-acknowledgement (ACK) transmission on PUSCH with uplink shared channel (UL-SCH), the number of coded modulation symbols per layer for HARQ-ACK transmission, denoted as $Q'_{ACK}$, can be determined based on a format similar to the following:

$$Q'_{ACK} = \min \left\{ \left[ \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right], \left[ \alpha \cdot \sum_{l=l_0}^{N_{symb,all}^{PUSCH}-1} M_{sc}^{UCI}(l) \right] \right\}$$

where $O_{ACK}$ is a number of HARK-ACK bits (e.g., the UCI), if $O_{ACK} \geq 360$, $L_{ACK}=11$; otherwise $L_{ACK}$ is the number of CRC bits for HARQ-ACK, $\beta_{offset}^{PUSCH} = \beta_{offset}^{HARQ-ACK}$ (e.g., where this can be the beta offset), $C_{UL-SCH}$ is the number of code blocks for UL-SCH of the PUSCH transmission, if the downlink control information (DCI) format scheduling the PUSCH transmission includes a code block group transmission information (CBGTI) field indicating that the UE may not transmit the r-th code block, $K_r=0$, otherwise, $K_r$ is the r-th code block size for UL-SCH of the PUSCH transmission, $M_{sc}^{PUSCH}$ is the scheduled bandwidth of the PUSCH transmission, expressed as a number of subcarriers, $M_{sc}^{PT-RS}(l)$ is the number of subcarriers in orthogonal frequency division multiplexing (OFDM) symbol l that carries phase tracking reference signal (PTRS), in the PUSCH transmission, $M_{sc}^{UCI}(l)$ is the number of resource elements that can be used for transmission of UCI in OFDM symbol l, for l=0, 1, 2, . . . , $N_{symb,all}^{PUSCH}-1$, in the PUSCH transmission and $N_{symb,all}^{PUSCH}$ is the total number of OFDM symbols of the PUSCH, including all OFDM symbols used for demodulation reference signal (DMRS), for any OFDM symbol that carries DMRS of the PUSCH, $M_{sc}^{UCI}(l)=0$, for any OFDM symbol that does not carry DMRS of the PUSCH, $M_{sc}^{UCI}(l)=M_{sc}^{PUSCH}-M_{sc}^{PT-RS}(l)$, $\alpha$ is configured by higher layer parameter scaling, and $l_0$ is the symbol index of the first OFDM symbol that does not carry DMRS of the PUSCH, after the first DMRS symbol(s), in the PUSCH transmission.

Other formulas can be used and/or specified in wireless communications technologies (e.g., based at least in part on the beta offset $\beta_{offset}^{PUSCH}$) to determine the number of coded modulated symbols per layer for UCI in different scenarios (e.g., for whether PUSCH data is to be multiplexed with the UCI, for different types of UCI, etc.). In 5G NR, UEs can be configured, using radio resource control (RRC) signaling, with either (1) a semi-static beta offset or (2) a set of dynamic beta offsets, from which one dynamic beta offset can be specified in corresponding DCI (e.g., where the DCI may include a resource grant for the PUSCH resources), but not both. Where the UE is configured to use dynamic beta offsets, a base station may transmit DCI in a DCI format that does not include a dynamic beta offset selection. For example, a fallback DCI format (e.g., DCI format 0_0) can be used when dynamic beta offset selection is configured in RRC signaling, but the base station does not specify the dynamic beta offset selection in the fallback DCI format. In this example, UE behavior for determining the beta offset is currently undefined.

Aspects described herein relate to determining the UE behavior regarding beta offset when dynamic beta offsets are configured, but the UE does not receive an indication of which dynamic beta offset to select. In one example, the base station can configure the UE with both the semi-static beta offset and the set of dynamic beta offsets, and the UE can use the semi-static beta offset where a selection of a dynamic beta offset is not specified. In another example, the UE can select one of the set of dynamic beta offsets, where a selection of a dynamic beta offset is not specified in the DCI. For example, the UE can select the first or last dynamic beta offset in the configured set. In yet another example, the UE can select one of the set of dynamic beta offsets as a function of information related to DCI, such as a starting control channel element (CCE) of the physical downlink control channel (PDCCH) that carries the DCI, a number of CCEs in a control resource set (CORESET) of the PDCCH reception, etc. where a selection of a dynamic beta offset is not specified. In yet another example, the UE can use a default beta offset specified in a specification for the wireless communication technology (e.g., as stored in a memory of the UE) where a selection of a dynamic beta offset is not specified. In a further example, the UE may refrain from transmitting or multiplexing UCI over the PUSCH resources where a selection of a dynamic beta offset is not specified. In addition, for example, the base station can perform a corresponding determination for the beta offset to receive and process (e.g., demultiplex) the UCI from the PUSCH resources. In these examples, the UE can accordingly function to determine the beta offset where dynamic beta offsets are configured but no selection of a dynamic beta offset is received from the base station.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining a beta offset for transmitting UCI over shared channel resources. In addition, some nodes may have a modem 340 and scheduling component 342 for scheduling and/or indicating shared channel resources over which to transmit UCI, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can determine a beta offset for determining shared channel resources (e.g., PUSCH resources) over which to transmit (and/or multiplex) UCI. For example, UE 104 can be configured with a semi-statically configured beta offset and/or a set of possible dynamic beta offsets, which can be further selected or indicated using DCI (e.g., for an uplink resource grant for the PUSCH or other resources). In this example, communicating component 242 can determine the beta offset including a case where the set of possible dynamic beta offsets are configured but selection of one of the set is not indicated (e.g., by the base station 102), as described further herein. In addition, scheduling component 342 can configure one or more UEs 104 with a beta offset for determining shared channel resources (e.g., PUSCH resources) over which to transmit (and/or multiplex) UCI, and can similarly determine the beta offset including the case where the set of possible dynamic beta offsets are configured but selection of one of the set is not indicated (e.g., by the base station 102), as described further herein.

Figure 2:
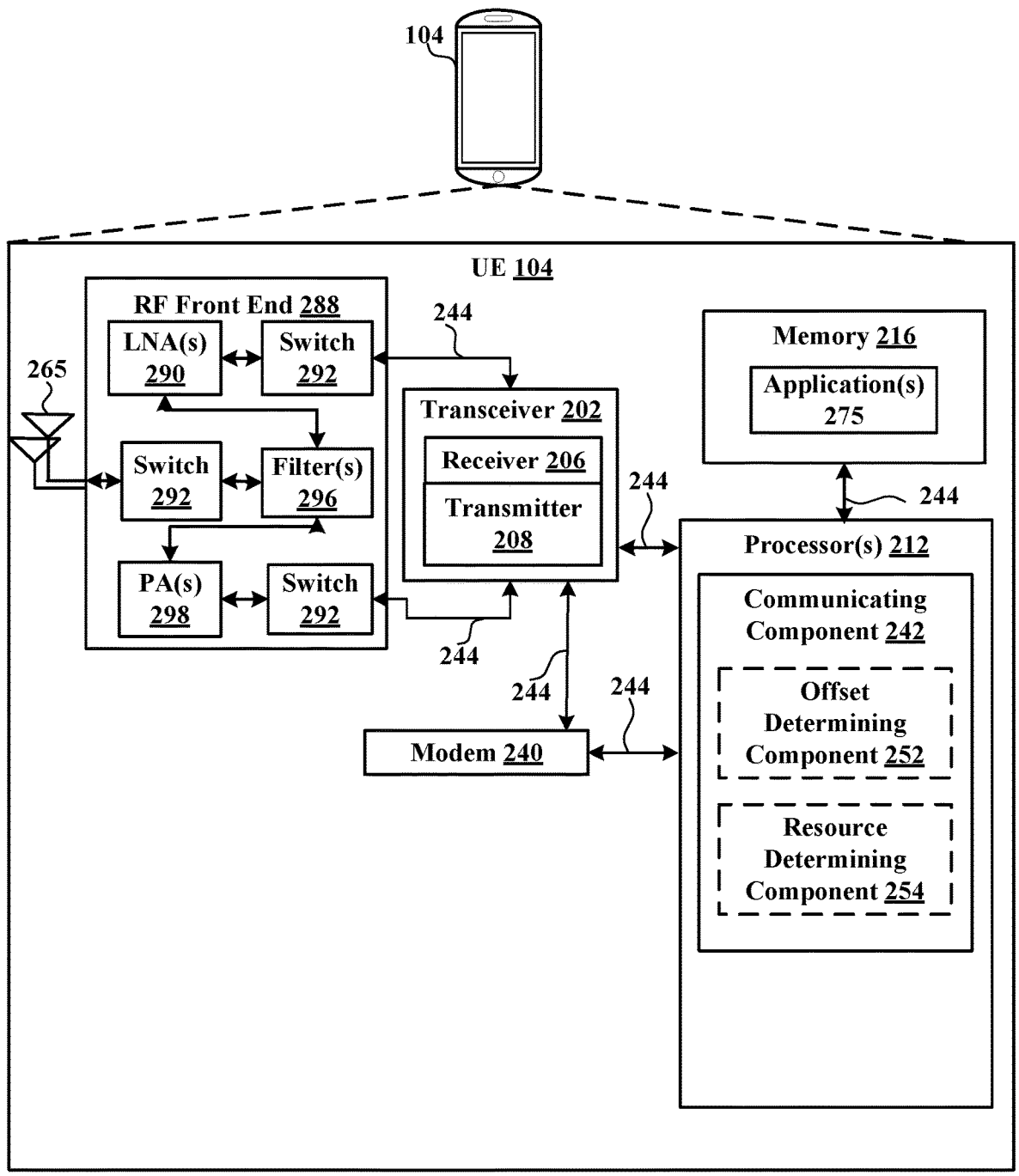
FIG. 2 is a block diagram illustrating an example of a UE, in accordance with various aspects of the present disclosure.
Figure 3:
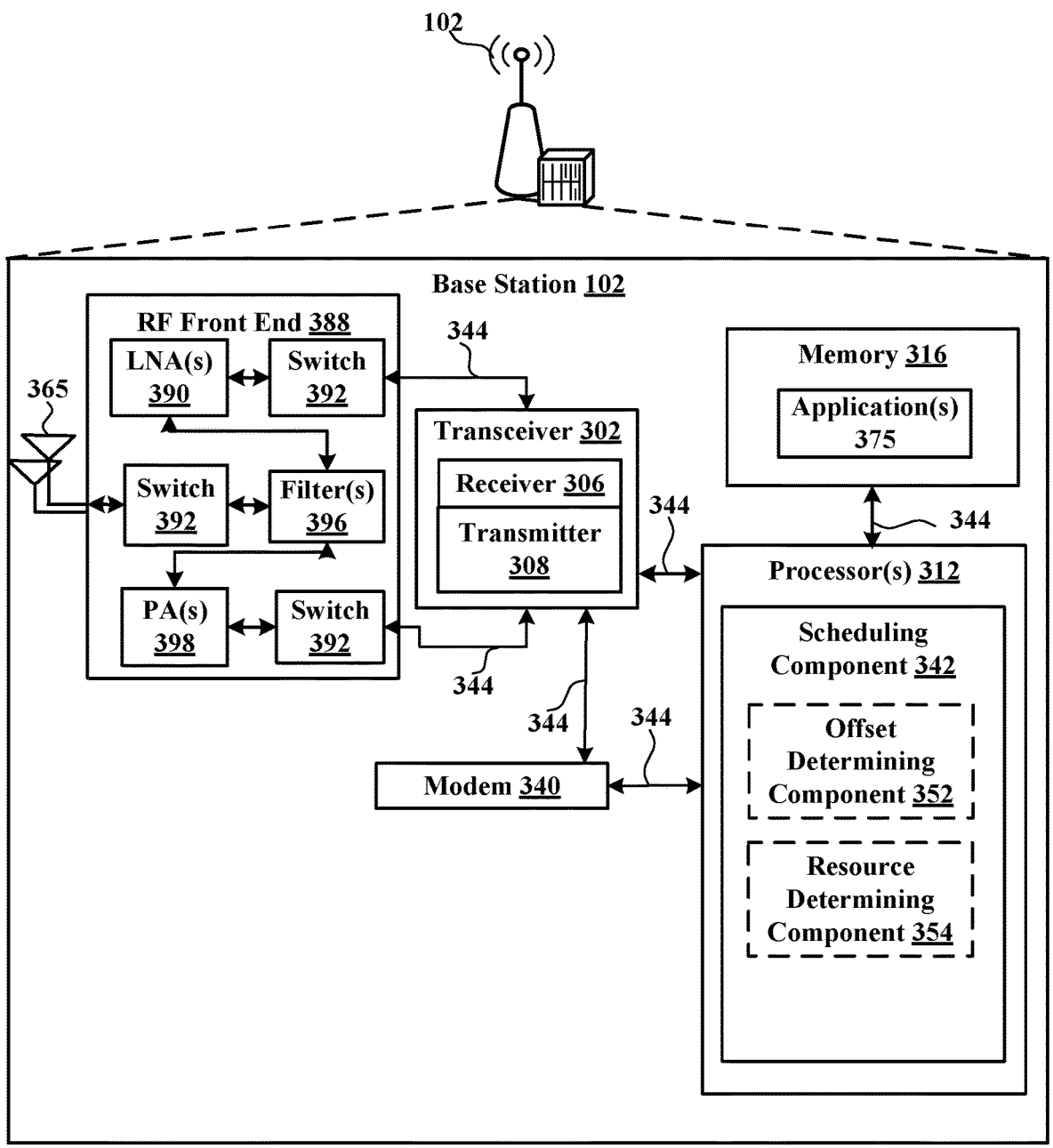
FIG. 3 is a block diagram illustrating an example of a base station, in accordance with various aspects of the present disclosure.
Figure 4:
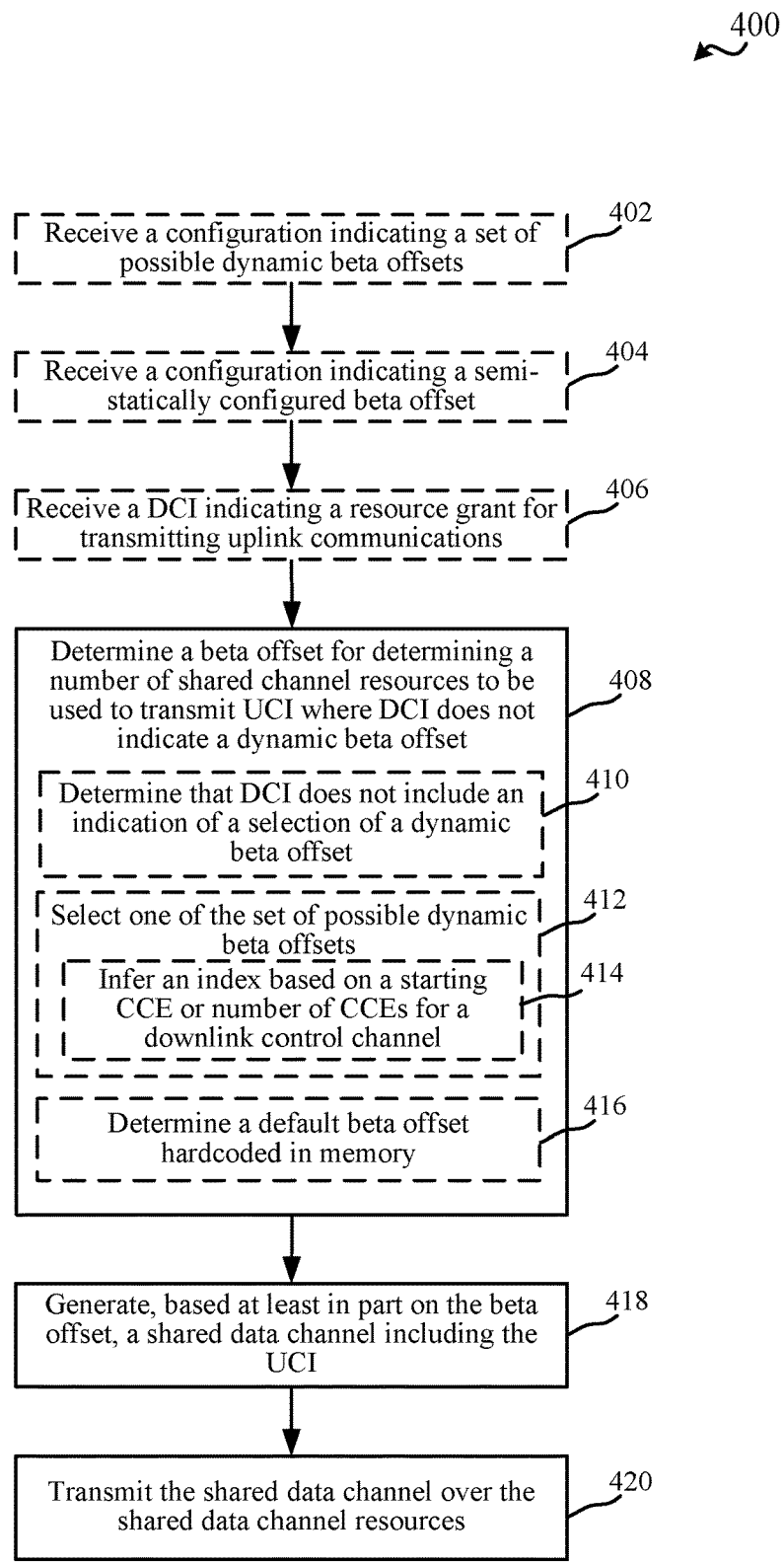
FIG. 4 is a flow chart illustrating an example of a method for determining a beta offset for transmitting uplink control information (UCI) over shared channel resources, in accordance with various aspects of the present disclosure.
Figure 5:
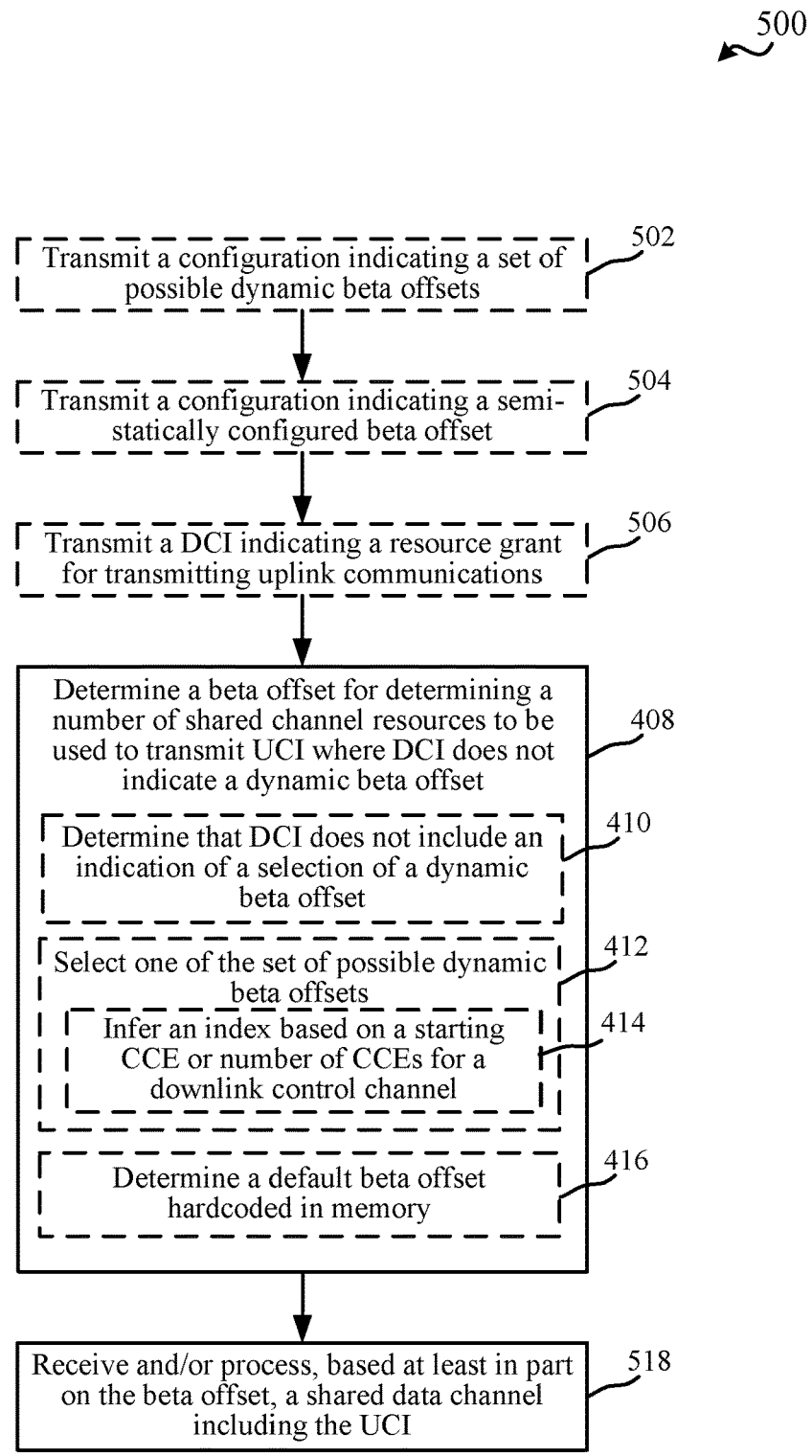
FIG. 5 is a flow chart illustrating an example of a method for determining a beta offset for receiving UCI over shared channel resources, in accordance with various aspects of the present disclosure.
Figure 6:
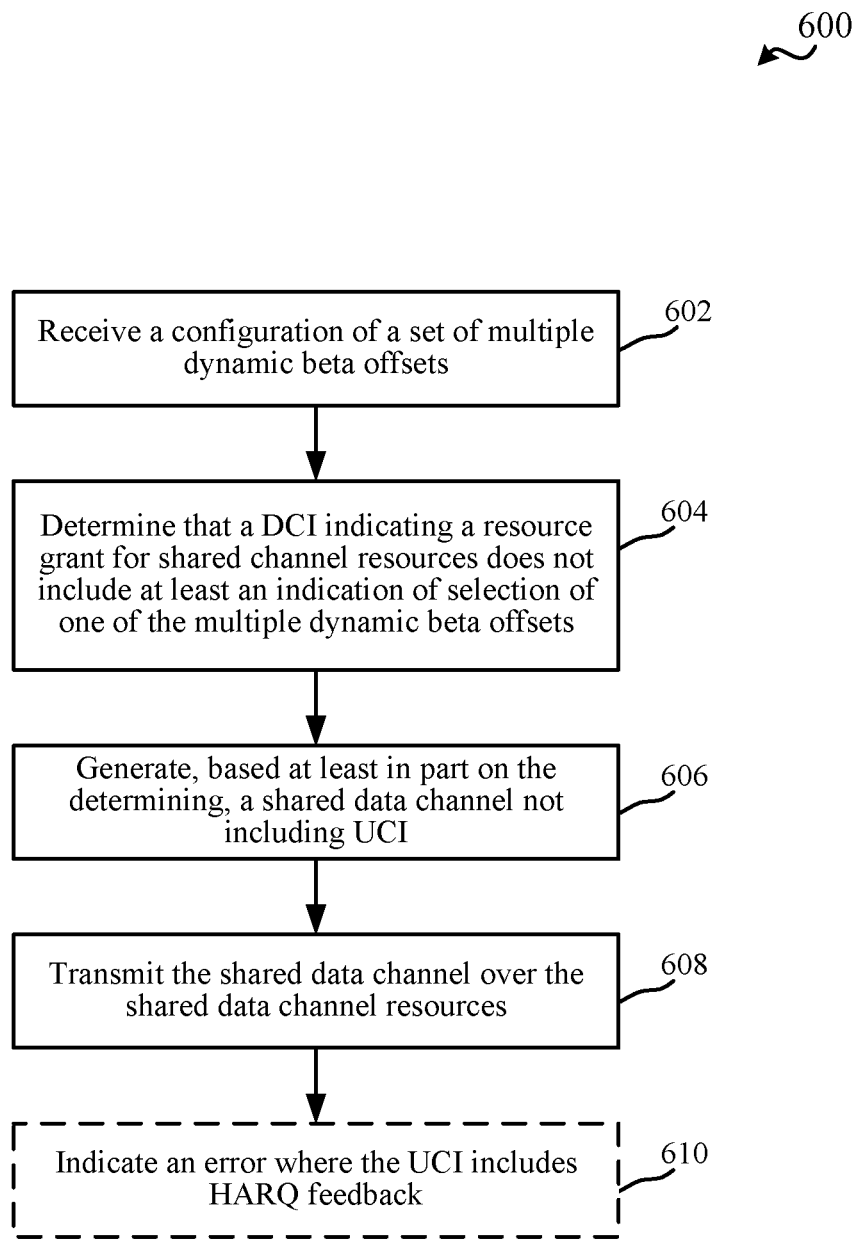
FIG. 6 illustrates an example of a system for refraining from transmitting UCI over shared channel resources, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining a beta offset for transmitting and/or multiplexing UCI over data channel (e.g., shared channel) resources, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include an offset determining component 252 for determining a beta offset for determining shared channel resources over which to transmit or multiplex UCI, and/or a resource determining component 254 for determining the shared channel resources based on the beta offset, as described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling communications and/or determining a beta offset for receiving and/or processing UCI over data channel (e.g., shared channel) resources, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include an offset determining component 352 for determining a beta offset for determining shared channel resources over which to receive UCI, and/or a resource determining component 354 for determining the shared channel resources based on the beta offset, as described herein, for receiving and/or processing the UCI from the shared channel resources.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for determining a beta offset for determining shared channel resources over which to transmit UCI. FIG. 5 illustrates a flow chart of an example of a method 500 for determining a beta offset for determining shared channel resources over which to receive or process UCI. Methods 400 and 500 are described in conjunction with one another for ease of explanation, though the methods 400 and 500 are not required to be performed in conjunction. In an example, a UE 104 can perform the functions described in method 400 using one or more of the components described in FIGS. 1 and 2 and/or a base station 102 and/or other network component can perform the functions described in method 500 using one or more of the components described in FIGS. 1 and 3.

In method 400, optionally at Block 402, a configuration indicating a set of possible dynamic beta offsets can be received. In an aspect, offset determining component 252, e.g., in conjunction with processor(s) 212, memory 216, transceiver 202, communicating component 242, etc., can receive the set of possible dynamic beta offsets. For example, offset determining component 252 can receive the set of possible dynamic beta offsets in a configuration from a base station (e.g., an RRC configuration). In a specific example for 5G NR, for the case of dynamic beta offsets, the configuration from the base station 102 may indicate four possible beta offset values, which may be indicated in a table of a value and a corresponding index, an enumeration of values from which an index can be implied based on a position of a value within the enumeration, etc.

In method 400, optionally at Block 404, a configuration indicating a semi-statically configured beta offset can be received. In an aspect, offset determining component 252, e.g., in conjunction with processor(s) 212, memory 216, transceiver 202, communicating component 242, etc., can receive the configuration indicating the semi-statically configured beta offset. For example, offset determining component 252 can receive the semi-statically configured beta offset in a configuration from a base station (e.g., an RRC configuration, which may be the same or a different RRC configuration from which the set of possible dynamic beta offsets are received). Currently in 5G NR, the beta offset can be configured as a choice between the set of possible dynamic beta offsets or the semi-statically configured beta offset, but not both. As described further herein, for some DCI formats, and where dynamic beta offsets are configured, bits (e.g., two bits for four possible beta offset values) in DCI can be used to dynamically select one of the set of possible beta offsets received in the configuration.

In method 400, optionally at Block 406, a DCI indicating a resource grant for transmitting uplink communications can be received. In an aspect, communicating component 242, e.g., in conjunction with processor(s) 212, memory 216, transceiver 202, etc., can receive the DCI indicating the resource grant for transmitting uplink communications. For example, communicating component 242 can receive the DCI in a downlink control channel (e.g., PDCCH), which can indicate resources (e.g., time and/or frequency resources) over which the UE can transmit communications to the base station 102. Thus, for example, the resource grant can indicate shared channel resources, such as PUSCH resources, over which the UE 104 can transmit uplink communications. For example, the DCI can be of a certain format, such as DCI Format 0_0, DCI Format 0_1, etc., which may or may not have bits to indicate one of the set of possible beta offsets to use, where dynamic beta offsets are configured. In an example, the DCI can include the resource grant specifying the resources or can include an activation of resources previously indicated in a type 2 configured grant received from the base station.

In method 500, optionally at Block 502, a configuration indicating a set of possible dynamic beta offsets can be transmitted. In an aspect, scheduling component 342, e.g., in conjunction with processor(s) 312, memory 316, transceiver 302, etc., can transmit the set of possible dynamic beta offsets. For example, scheduling component 342 can transmit the set of possible dynamic beta offsets in a configuration to a UE (e.g., an RRC configuration), which may include the indication of four possible beta offset values as described. In other examples, another number of possible beta offset values can be similarly configured.

In method 500, optionally at Block 504, a configuration indicating a semi-statically configured beta offset can be transmitted. In an aspect, scheduling component 342, e.g., in conjunction with processor(s) 312, memory 316, transceiver 302, etc., can transmit the configuration indicating the semi-statically configured beta offset. For example, scheduling component 342 can transmit the semi-statically configured beta offset in a configuration to a UE (e.g., an RRC configuration, which may be the same or a different RRC configuration from which the set of possible dynamic beta offsets are transmitted). In 5G NR, as described, shared channel resources (e.g., PUSCH) can be dynamically scheduled by another DCI format that does not include a beta offset field (e.g., does not include a selection of one of the set of possible dynamic beta offsets). For example, DCI format 0_0, which is a fallback DCI format, may not have the beta offset field. Aspects described further herein relate to determining a beta offset or refraining from transmitting UCI in this scenario and/or similar scenarios where a beta offset is not, or cannot be, determined. In addition, the UE 104 and base station 102 can similarly determine the beta offset to use, such to determine how to transmit (e.g., by the UE 104) and/or receive/process (by the base station 102) UCI that over shared channel resources (e.g., as multiplexed with non-control data and/or otherwise).

In method 500, optionally at Block 506, a DCI indicating a resource grant for transmitting uplink communications can be transmitted. In an aspect, scheduling component 342, e.g., in conjunction with processor(s) 312, memory 316, transceiver 302, etc., can transmit the DCI indicating the resource grant for transmitting uplink communications. For example, scheduling component 342 can transmit the DCI in a downlink control channel (e.g., PDCCH), which can indicate resources (e.g., time and/or frequency resources) over which a UE can transmit communications to the base station 102 (e.g., shared channel resources, such as PUSCH resources). For example, the DCI can be of a certain format, such as DCI Format 0_0, DCI Format 0_1, etc., which may or may not have bits to indicate one of the set of possible beta offsets to use, where dynamic beta offsets are configured. In an example, the DCI can include the resource grant specifying the resources or can include an activation of resources previously indicated in a type 2 configured grant transmitted by the base station.

In method 400, at Block 408, a beta offset for determining a number of shared channel resources to be used to transmit UCI where DCI does not indicate a dynamic beta offset can be determined. In an aspect, offset determining component 252, e.g., in conjunction with processor(s) 212, memory 216, transceiver 202, communicating component 242, etc., can determine the beta offset for determining the number of shared channel resources to be used to transmit UCI where DCI does not indicate the dynamic beta offset. For example, offset determining component 252 can determine the beta offset for transmitting HARQ feedback, channel state information (CSI) (e.g., periodic CSI (P-CSI) report, semi-persistent channel state information (SP-CSI) report, or other CSI reports), etc. For example, as described, the UE 104 can be configured with the possible dynamic beta offsets, but may receive a DCI that does not indicate which dynamic beta offset to use (e.g., DCI Format 0_0 or other DCI format or information that does not include bits or other indicator specifying which of multiple configured dynamic beta offsets to use in transmitting the UCI).

In determining the beta offset at Block 408, optionally at Block 410, it can be determined that DCI does not include an indication of a selection of a dynamic beta offset. For example, offset determining component 252, e.g., in conjunction with processor(s) 212, memory 216, transceiver 202, communicating component 242, etc., can determine that DCI does not include the indication of the selection of the dynamic beta offset. In one example, offset determining component 252 can determine this based on a DCI format of the DCI received. For example, communicating component 242 can receive DCI from the base station 102 over a downlink control channel (e.g., PDCCH), as described, which may be for the purposes of scheduling resources for the UE 104 to use in transmitting UCI. In an example, the DCI may indicate a resource grant for uplink resources (e.g., for the shared channel resources, such as PUSCH resources). For example, offset determining component 252 can determine that the DCI does not include the selection of beta offset based on the DCI format. In a specific example, offset determining component 252 can determine that the DCI is of DCI format 0_0, which may not have the capability to indicate, or otherwise may not indicate, the section of beta offset bits. In addition, in an example, offset determining component 252 can determine that the DCI does not include the selection of beta offset based on first determining that set of possible dynamic beta offsets are configured by the base station 102 (e.g., based on receiving the configuration at Block 402).

In one example, where offset determining component 252 determines that the DCI does not include the indication of the selection of the dynamic beta offset, offset determining component 252 can determine to use a semi-statically configured beta offset. In this example, the base station 102 can be capable of configuring both the semi-statically configured beta offset and the set of possible dynamic beta offsets. As such, in this example, the UE 104 can receive the configuration indicating the set of possible dynamic beta offsets and the semi-statically configured beta offset (e.g., at Blocks 402 and 404), and the base station 102 can transmit both (e.g., at Blocks 502 and 504), whether in a separate or the same configuration (e.g., in one or more RRC messages).

In a specific example, the base station can configure both semi-static and dynamic beta offsets. In this case, if a PUSCH is scheduled by a DCI format 0_0, then UE can use the semi-statically configured beta offset. If a PUSCH is configured with a DCI format 0_1, and the DCI format 0_1 includes a beta offset field, then UE can use the dynamically signaled beta offset that is dynamically selected (e.g., via DCI) from the set of possible dynamic offsets received from the base station (e.g., as described in Blocks 402 and 502).

In another example, in determining the beta offset at Block 408, optionally at Block 412, one of the set of possible dynamic beta offsets can be selected. For example, offset determining component 252, e.g., in conjunction with processor(s) 212, memory 216, transceiver 202, communicating component 242, etc., can select one of the set of possible dynamic beta offsets. For example, offset determining component 252 can be configured to select a specific one of the set of possible dynamic beta offsets where it determines that the DCI does not indicate the dynamic beta offset (e.g., and where it determines that dynamic beta offsets have been configured). In this example, offset determining component 252 can select the specific dynamic beta offset for transmitting HARQ feedback, CSI, or other UCI.

For example, offset determining component 252 can determine to select a first dynamic beta offset in the set of dynamic beta offsets, a last dynamic beta offset in the set, a dynamic beta offset at a computed position in the set, a dynamic beta offset having a minimum value in the set, a dynamic beta offset having a maximum value in the set, a mean or median average of the values of the dynamic beta offsets in the set, etc. For example, if UE is configured with dynamic beta offset indication, and a PUSCH is scheduled by a DCI format 0_0 (which does not include the beta offset field), then UE can use the first (or the last) of the four configured beta offset values. For example, the set of possible dynamic beta offsets may include a set of four offsets, as described, which can be indicated by a 2 bit beta offset indication value (which can be the value indicated in DCI to select one of the possible dynamic beta offsets), as shown below:

| Beta Offset Index | Beta Offset |
|---|---|
| 00 | $\beta_0$ |
| 01 | $\beta_1$ |
| 10 | $\beta_2$ |
| 11 | $\beta_3$ |

For example, selecting the beta offset where a selected dynamic beta offset is not indicated in DCI may include selecting the beta offset corresponding to beta offset index $\beta_0$ (e.g., the first beta offset), $\beta_3$ (e.g., the last beta offset), and/or the like.

In another example, in selecting the one of the set of possible dynamic beta offsets at Block 412, optionally at Block 414, an index can be inferred based on a starting CCE or number of CCEs for a downlink control channel. For example, offset determining component 252, e.g., in conjunction with processor(s) 212, memory 216, transceiver 202, communicating component 242, etc., can infer the index (e.g., the beta offset index into the set of possible dynamic beta offsets, an example of which is shown and described above) based on the starting CCE, number of CCEs, or other parameters for the downlink control channel. For example, the downlink control channel can be the channel over which the DCI is received (e.g., a PDCCH over which the DCI is received, as described above). Thus, for example, the beta offset to use can be implicitly signaled via DCI format 0_0, where the UE can infer the beta offset value (e.g., from the four configured values) based on some parameters associated with the received DCI (e.g., the starting CCE of the PDCCH that carries the DCI format 0_0). In one specific example, the beta offset can be determined as:

$$d_{betaOffset} = \left\lfloor \frac{4 \cdot n_{CCE}}{N_{CCE}} \right\rfloor, \text{ where } d_{betaOffset}$$

can be a beta offset index, as described above (which can be used to select the beta offset from the set of possible dynamic beta offsets), $n_{CCE}$ is the index of a first CCE for the PDCCH reception, and $N_{CCE}$ denotes the number of CCEs in a CORESET of the PDCCH reception.

In determining the beta offset at Block 408, optionally at Block 416, a default beta offset can be determined as hardcoded in a memory. For example, offset determining component 252, e.g., in conjunction with processor(s) 212, memory 216, transceiver 202, communicating component 242, etc., can determine the default beta offset (e.g., to be used when no beta offset can be determined) as hardcoded in the memory (e.g., memory 216). For example, the default value can be as indicated in a specification for a wireless communication technology, and thus can be coded in the UE 104, stored in a configuration in memory 216 for the UE 104, etc. For example, the UE can use a default value as the beta offset, which can be written/hardcoded in the specification. In this example, all base stations and/or UEs can use the same beta offset for transmitting UCI in shared channel resources. In one example, the default value may be used before the UE establishes RRC connection with the base station.

In method 400, at Block 418, a shared data channel including the UCI can be generated based at least in part on the beta offset. For example, resource determining component 254, e.g., in conjunction with processor(s) 212, memory 216, transceiver 202, communicating component 242, etc., can generate, based at least in part on the beta offset, the shared data channel (e.g., PUSCH) including the UCI. For example, resource determining component 254 can determine, based at least in part on the beta offset, resources (e.g., time and/or frequency resources) of the shared data channel over which to transmit the UCI. As described, this may include computing the number of coded modulation symbols (e.g., per layer, per UCI transmission, such as a HARQ-ACK in one example), which may include determining a starting symbol and/or a duration of symbols, a number of resource blocks, which may include determining a starting resource block and/or a span of resource blocks, and/or the like, based at least in part on the beta offset. Moreover, in generating the shared data channel with the UCI, resource determining component 254 may multiplex UCI with data (e.g., non-control) communications, where the determined resources overlap with the data, or may not multiplex UCI with data.

In method 400, at Block 420, the shared data channel can be transmitted over the shared data channel resources. For example, communicating component 242, e.g., in conjunction with processor(s) 212, memory 216, transceiver 202, etc., can transmit the shared data channel over the shared data channel resources, where the shared data channel may include UCI multiplexed with data (e.g., non-control) communications, UCI that is not multiplexed, and/or the like.

In addition, method 500 can include blocks 408, 410, 412, 414, 416, or similar Blocks where offset determining component 352, e.g., in conjunction with processor(s) 312, memory 316, transceiver 302, scheduling component 342, etc. (e.g., in a base station), can determine the beta offset where it is not indicated in the DCI based on determining that the DCI does not include the indication of the selection of the dynamic beta offset, based on using a semi-statically configured beta offset, based on selecting one of the set of possible dynamic beta offsets (e.g., a first one, last one, etc., one selected based on inferring an index, and/or the like), based on determining a default beta offset hardcoded in memory, etc.

In method 500, at Block 518, a shared data channel including the UCI can be received and/or processed based at least in part on the beta offset. For example, resource determining component 352, e.g., in conjunction with processor(s) 312, memory 316, transceiver 302, scheduling component 342, etc., can receive and/or process, based at least in part on the beta offset, the shared data channel including the UCI. Thus, for example, resource determining component 352 can use the determined beta offset to locate UCI in the shared channel communications, which may include determining resources (e.g., time and/or frequency resources) over which UCI is multiplexed with data (e.g., non-control) communications, resources over which UCI is transmitted and not multiplexed, and/or the like. In this regard, as described, the UE 104 can transmit UCI in PUSCH using a determined beta offset, that is similarly determined by the base station, at least where dynamic beta offsets are configured, but are not specified (e.g., in the DCI, by the DCI format, etc.).

FIG. 6 illustrates a flow chart of an example of a method 600 for refraining from transmitting UCI where a beta offset is not determined. In an example, a UE 104 can perform the functions described in method 600 using one or more of the components described in FIGS. 1 and 2.

In method 600, at Block 602, a configuration of a set of multiple dynamic beta offsets can be received. In an aspect, offset determining component 252, e.g., in conjunction with processor(s) 212, memory 216, transceiver 202, communicating component 242, etc., can receive the configuration of the set of multiple dynamic beta offsets. As described above, offset determining component 252 can receive the set of multiple possible dynamic beta offsets in an RRC configuration.

In method 600, at Block 604, it can be determined that a DCI indicating a resource grant for shared channel resources does not include at least an indication of selection of one of the multiple dynamic beta offsets. In an aspect, offset determining component 252, e.g., in conjunction with processor(s) 212, memory 216, transceiver 202, communicating component 242, etc., can determine that the DCI (e.g., a DCI received via PDCCH) indicating a resource grant for shared channel resources (e.g., PUSCH resources) does not include at least the indication of selection of one of the multiple dynamic beta offsets. In an example, as described, offset determining component 252 can determine that the DCI does not indicate the selection of the one of the multiple dynamic beta offsets based on determining a format of the DCI (e.g., as DCI format 0_0).

In method 600, at Block 606, a shared data channel not including UCI can be generated based at least in part on the determining. In an aspect, resource determining component 254, e.g., in conjunction with processor(s) 212, memory 216, transceiver 202, communicating component 242, etc., can generate, based at least in part on the determining that the DCI indicating a resource grant for shared channel resources does not include at least the indication of selection of one of the multiple dynamic beta offsets, the shared data channel not including the UCI. For example, resource determining component 254 can determine, in this regard, not to transmit the UCI as the beta offset cannot be determined (e.g., is not indicated by the DCI), and thus the UCI can be dropped.

In method 600, at Block 608, the shared data channel can be transmitted over the shared data channel resources. In an aspect, communicating component 242, e.g., in conjunction with processor(s) 212, memory 216, transceiver 202, etc., can transmit the shared data channel over the shared data channel resources (e.g., to the base station 102) without the UCI.

In method 600, optionally at Block 610, an error can be indicated where the UCI includes HARQ feedback In an aspect, resource determining component 254, e.g., in conjunction with processor(s) 212, memory 216, transceiver 202, communicating component 242, etc., can indicate the error where the UCI includes the HARQ feedback. For example, resource determining component 254 can indicate the error to another component in UE 104 to cause remedial behavior. For example, UE 104 may accordingly retransmit the UCI, transmit the UCI over different resources (e.g., PUCCH resources, subsequent PUSCH resources, etc.), enter a certain communication state, and/or the like.

For example, the UE 104 may not transmit UCI on a PUSCH scheduled by DCI format 0_0, if the UE is RRC configured with dynamic beta offset signaling. In this case, for example, if the UCI is P-CSI report or SP-CSI report on PUCCH, then UE can drop the P-CSI or the SP-CSI and transmit only data (e.g., non-control) communications where present. If the UCI is HARQ-ACK feedback (e.g., ACK, non-ACK (HACK), etc.), then UE can treat as an error case. For example, HARQ feedback can be considered to be more important (or higher priority) than PUSCH. In this regard, the PUSCH can be dropped to protect the HARQ-ACK feedback; however, if UE needs to transmit HARQ-ACK feedback on PUSCH, then the grant for PUSCH must come later than the grant for HARQ-ACK feedback, and it may not be intuitive for the base station to schedule a PUSCH transmission, which it knows will be cancelled/dropped. In other words, for example, a UE may not expect to be scheduled with a PUSCH by a DCI format 0_0 to overlap with a PUCCH transmission carrying HARQ-ACK feedback.

Figure 7:
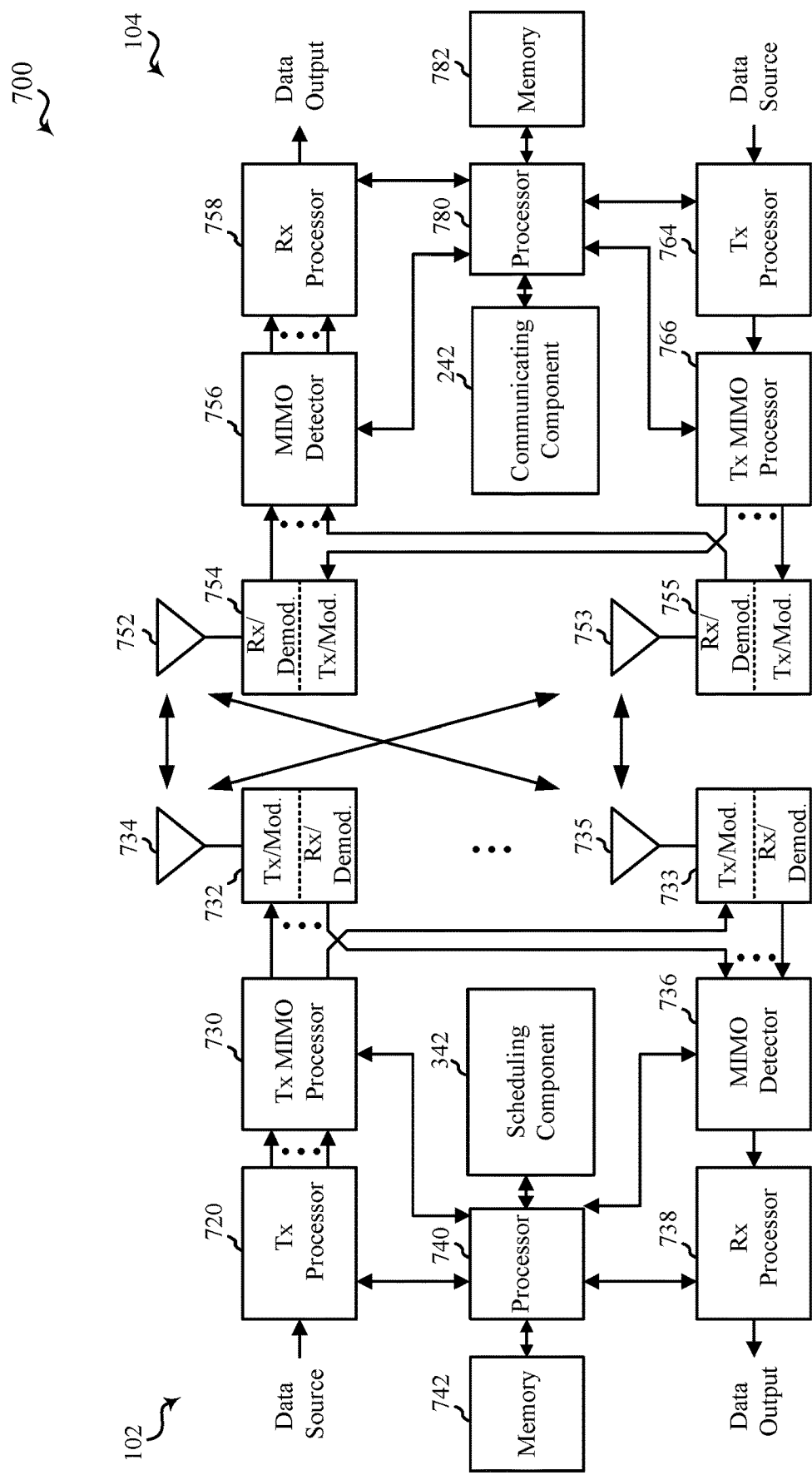
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104, in accordance with various aspects of the present disclosure. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising:
determining a beta offset for determining a number of shared channel resources to be used to transmit uplink control information, where a downlink control information indicating a resource grant for the shared channel resources does not include at least an indication of selection of a dynamic beta offset;
generating, based at least in part on the beta offset, a shared data channel including the uplink control information; and
transmitting the shared data channel over the shared data channel resources.

2. The method of example 1, further comprising receiving a configuration indicating a set of multiple possible dynamic beta offsets, wherein determining the beta offset comprises selecting one of the set of multiple possible dynamic beta offsets.

3. The method of example 2, wherein determining the beta offset comprises selecting a first one in the set of multiple possible dynamic beta offsets.

4. The method of any of examples 2 or 3, wherein the set of multiple possible dynamic beta offsets are indicated in a table having associated indices, and wherein determining the beta offset comprises selecting one of the multiple possible dynamic beta offsets having a lowest index in the table.

5. The method of any of examples 2 to 4, wherein determining the beta offset comprises selecting a last one in the set of multiple possible dynamic beta offsets.

6. The method of any of examples 2 to 5, wherein selecting one of the set of multiple possible dynamic beta offsets comprises:
inferring an index based at least in part on at least one of a starting control channel element or a number of control channel elements of a channel over which the downlink control information is received; and
selecting the one of the set of multiple possible dynamic beta offsets based at least in part on the index.

7. The method of any of examples 1 to 6, further comprising determining that the downlink control information does not include at least the indication of selection of the dynamic beta offset based at least in part on determining a format of the downlink control information.

8. The method of any of examples 1 to 7, further comprising receiving a configuration indicating a set of multiple possible dynamic beta offsets and a semi-static beta offset, wherein determining the beta offset comprises determining the semi-static beta offset.

9. A method of wireless communication, comprising:
determining a beta offset for determining a number of shared channel resources to be used to transmit uplink control information, where a downlink control information indicating a resource grant for the shared channel resources does not include at least an indication of selection of a dynamic beta offset; and
receiving, based at least in part on the beta offset, a shared data channel including the uplink control information.

10. The method of example 9, further comprising transmitting a configuration indicating a set of multiple possible dynamic beta offsets, wherein determining the beta offset comprises selecting one of the set of multiple possible dynamic beta offsets.

11. The method of example 10, wherein determining the beta offset comprises selecting a first one in the set of multiple possible dynamic beta offsets.

12. The method of any of examples 10 or 11, wherein the set of multiple possible dynamic beta offsets are indicated in a table having associated indices, and wherein determining the beta offset comprises selecting one of the multiple possible dynamic beta offsets having a lowest index in the table.

13. The method of any of examples 10 to 12, wherein determining the beta offset comprises selecting a last one in the set of multiple possible dynamic beta offsets.

14. The method of any of examples 10 to 13, wherein selecting one of the set of multiple possible dynamic beta offsets comprises:
inferring an index based at least in part on at least one of a starting control channel element or a number of control channel elements of a channel over which the downlink control information is received; and
selecting the one of the set of multiple possible dynamic beta offsets based at least in part on the index.

15. The method of any of examples 9 to 14, further comprising determining that the downlink control information does not include at least the indication of selection of the dynamic beta offset based at least in part on determining a format of the downlink control information.

16. The method of any of examples 9 to 15, further comprising transmitting a configuration indicating a set of multiple possible dynamic beta offsets and a semi-static beta offset, wherein determining the beta offset comprises determining the semi-static beta offset.

17. The method of any of examples 9 to 16, wherein determining the beta offset comprises determining a default beta offset hardcoded in a memory.

18. An apparatus for wireless communication, comprising:
a transceiver;
a memory configured to store instructions; and
one or more processors communicatively coupled with the transceiver and the memory, wherein the one or more processors are configured to:
determine a beta offset for determining a number of shared channel resources to be used to transmit uplink control information, where a downlink control information indicating a resource grant for the shared channel resources does not include at least an indication of selection of a dynamic beta offset;
generate, based at least in part on the beta offset, a shared data channel including the uplink control information; and transmit the shared data channel over the shared data channel resources.

19. The apparatus of example 18, wherein the one or more processors are further configured to receive a configuration indicating a set of multiple possible dynamic beta offsets, wherein the one or more processors are configured to determine the beta offset at least in part by selecting one of the set of multiple possible dynamic beta offsets.

20. The apparatus of example 19, wherein the one or more processors are configured to determine the beta offset at least in part by selecting a first one in the set of multiple possible dynamic beta offsets.

21. The apparatus of any of examples 19 or 20, wherein the set of multiple possible dynamic beta offsets are indicated in a table having associated indices, and wherein the one or more processors are configured to determine the beta offset at least in part by selecting one of the multiple possible dynamic beta offsets having a lowest index in the table.

22. The apparatus of any of examples 19 to 21, wherein the one or more processors are configured to determine the beta offset at least in part by selecting a last one in the set of multiple possible dynamic beta offsets.

23. The apparatus of any of examples 19 to 22, wherein the one or more processors are configured to select one of the set of multiple possible dynamic beta offsets at least in part by:
inferring an index based at least in part on at least one of a starting control channel element or a number of control channel elements of a channel over which the downlink control information is received; and
selecting the one of the set of multiple possible dynamic beta offsets based at least in part on the index.

24. The apparatus of any of examples 18 to 23, wherein the one or more processors are further configured to determine that the downlink control information does not include at least the indication of selection of the dynamic beta offset based at least in part on determining a format of the downlink control information.

25. The apparatus of any of examples 18 to 24, wherein the one or more processors are further configured to receive a configuration indicating a set of multiple possible dynamic beta offsets and a semi-static beta offset, wherein the one or more processors are configured to determine the beta offset at least in part by determining the semi-static beta offset.

26. An apparatus for wireless communication, comprising:
a transceiver;
a memory configured to store instructions; and
one or more processors communicatively coupled with the transceiver and the memory, wherein the one or more processors are configured to:
determine a beta offset for determining a number of shared channel resources to be used to transmit uplink control information, where a downlink control information indicating a resource grant for the shared channel resources does not include at least an indication of selection of a dynamic beta offset; and
receive, based at least in part on the beta offset, a shared data channel including the uplink control information.

27. The apparatus of example 26, wherein the one or more processors are further configured to transmit a configuration indicating a set of multiple possible dynamic beta offsets, wherein the one or more processors are configured to determine the beta offset at least in part by selecting one of the set of multiple possible dynamic beta offsets.

28. The apparatus of example 27, wherein the one or more processors are configured to determine the beta offset comprises at least in part by a first one in the set of multiple possible dynamic beta offsets.

29. The apparatus of any of examples 27 or 28, wherein the set of multiple possible dynamic beta offsets are indicated in a table having associated indices, and wherein the one or more processors are configured to determine the beta offset at least in part by selecting one of the multiple possible dynamic beta offsets having a lowest index in the table.

30. The apparatus of any of examples 27 to 29, wherein the one or more processors are configured to determine the beta offset at least in part by selecting a last one in the set of multiple possible dynamic beta offsets.

31. The apparatus of any of examples 27 to 30, wherein the one or more processors are configured to select one of the set of multiple possible dynamic beta offsets at least in part by:
inferring an index based at least in part on at least one of a starting control channel element or a number of control channel elements of a channel over which the downlink control information is received; and
selecting the one of the set of multiple possible dynamic beta offsets based at least in part on the index.

32. The apparatus of any of examples 26 to 31, wherein the one or more processors are further configured to determine that the downlink control information does not include at least the indication of selection of the dynamic beta offset based at least in part on determining a format of the downlink control information.

33. The apparatus of any of examples 26 to 32, wherein the one or more processors are further configured to transmit a configuration indicating a set of multiple possible dynamic beta offsets and a semi-static beta offset, wherein the one or more processors are configured to determine the beta offset at least in part by determining the semi-static beta offset.

34. The apparatus of any of examples 26 to 33, wherein the one or more processors are configured to determine the beta offset at least in part by determining a default beta offset hardcoded in a memory.

35. An apparatus of wireless communication, comprising:
means for determining a beta offset for determining a number of shared channel resources to be used to transmit uplink control information, where a downlink control information indicating a resource grant for the shared channel resources does not include at least an indication of selection of a dynamic beta offset;
means for generating, based at least in part on the beta offset, a shared data channel including the uplink control information; and
means for transmitting the shared data channel over the shared data channel resources.

36. The apparatus of example 35, further comprising means for receiving a configuration indicating a set of multiple possible dynamic beta offsets, wherein the means for determining determines the beta offset at least in part by selecting one of the set of multiple possible dynamic beta offsets.

37. The apparatus of example 36, wherein the means for determining determines the beta offset at least in part by selecting a first one in the set of multiple possible dynamic beta offsets.

38. The apparatus of any of examples 36 or 37, wherein the set of multiple possible dynamic beta offsets are indicated in a table having associated indices, and wherein the means for determining determines the beta offset at least in part by selecting one of the multiple possible dynamic beta offsets having a lowest index in the table.

39. An apparatus of wireless communication, comprising:
means for determining a beta offset for determining a number of shared channel resources to be used to transmit uplink control information, where a downlink control information indicating a resource grant for the shared channel resources does not include at least an indication of selection of a dynamic beta offset; and
means for receiving, based at least in part on the beta offset, a shared data channel including the uplink control information.

40. The apparatus of example 39, further comprising means for transmitting a configuration indicating a set of multiple possible dynamic beta offsets, wherein the means for determining determines the beta offset at least in part by selecting one of the set of multiple possible dynamic beta offsets.

41. The apparatus of example 40, wherein the means for determining determines the beta offset at least in part by selecting a first one in the set of multiple possible dynamic beta offsets.

42. The apparatus of any of examples 40 or 41, wherein the set of multiple possible dynamic beta offsets are indicated in a table having associated indices, and wherein the means for determining determines the beta offset at least in part by selecting one of the multiple possible dynamic beta offsets having a lowest index in the table.

43. A computer-readable medium, comprising code executable by one or more processors for wireless communication, the code comprising code for:
determining a beta offset for determining a number of shared channel resources to be used to transmit uplink control information, where a downlink control information indicating a resource grant for the shared channel resources does not include at least an indication of selection of a dynamic beta offset;
generating, based at least in part on the beta offset, a shared data channel including the uplink control information; and
transmitting the shared data channel over the shared data channel resources.

44. The computer-readable medium of example 43, further comprising code for receiving a configuration indicating a set of multiple possible dynamic beta offsets, wherein the code for determining determines the beta offset at least in part by selecting one of the set of multiple possible dynamic beta offsets.

45. The computer-readable medium of example 44, wherein the code for determining determines the beta offset at least in part by selecting a first one in the set of multiple possible dynamic beta offsets.

46. The computer-readable medium of any of examples 44 or 45, wherein the set of multiple possible dynamic beta offsets are indicated in a table having associated indices, and wherein the code for determining determines the beta offset at least in part by selecting one of the multiple possible dynamic beta offsets having a lowest index in the table.

47. A computer-readable medium, comprising code executable by one or more processors for wireless communication, the code comprising code for:
determining a beta offset for determining a number of shared channel resources to be used to transmit uplink control information, where a downlink control information indicating a resource grant for the shared channel resources does not include at least an indication of selection of a dynamic beta offset; and
receiving, based at least in part on the beta offset, a shared data channel including the uplink control information.

48. The computer-readable medium of example 47, further comprising code for transmitting a configuration indicating a set of multiple possible dynamic beta offsets, wherein the code for determining determines the beta offset at least in part by selecting one of the set of multiple possible dynamic beta offsets.

49. The computer-readable medium of example 48, wherein the code for determining determines the beta offset at least in part by selecting a first one in the set of multiple possible dynamic beta offsets.

50. The computer-readable medium of any of examples 48 or 49, wherein the set of multiple possible dynamic beta offsets are indicated in a table having associated indices, and wherein the code for determining determines the beta offset at least in part by selecting one of the multiple possible dynamic beta offsets having a lowest index in the table.

What is claimed is:

1. A method of wireless communication, comprising:
receiving a configuration indicating a set of multiple possible dynamic beta offsets;
receiving downlink control information indicating a resource grant for shared channel resources, wherein the downlink control information does not include at least an indication of selection of a dynamic beta offset;
generating, based on receiving the downlink control information without the indication of selection of the dynamic beta offset, a shared data channel including uplink control information using a first one in the set of multiple possible dynamic beta offsets; and
transmitting the shared data channel over the shared data channel resources.

2. The method of claim 1, wherein the set of multiple possible dynamic beta offsets are indicated in a table having associated indices, and wherein generating the shared data channel includes using one in the set of multiple possible dynamic beta offsets having a lowest index in the table.

3. The method of claim 1, further comprising determining that the downlink control information does not include at least the indication of selection of the dynamic beta offset based at least in part on determining a format of the downlink control information.

4. The method of claim 1, further comprising receiving a configuration indicating a set of multiple possible dynamic beta offsets and a semi-static beta offset, wherein using the first one in the set of multiple possible dynamic beta offsets is based on determining the semi-static beta offset.

5. A method of wireless communication, comprising:
transmitting, to a user equipment (UE), a configuration indicating a set of multiple possible dynamic beta offsets; and
receiving, from the UE, over shared channel resources, and where a downlink control information indicating a resource grant for the shared channel resources does not include at least an indication of selection of a dynamic beta offset, a shared data channel including uplink control information using a first one in the set of multiple possible dynamic beta offsets.

6. The method of claim 5, wherein the set of multiple possible dynamic beta offsets are indicated in a table having associated indices, and wherein receiving the shared data channel includes using one in the set of multiple possible dynamic beta offsets having a lowest index in the table.

7. The method of claim 5, further comprising determining that the downlink control information does not include at least the indication of selection of the dynamic beta offset based at least in part on determining a format of the downlink control information.

8. The method of claim 5, further comprising transmitting a configuration indicating a set of multiple possible dynamic beta offsets and a semi-static beta offset, wherein using the first one in the set of multiple possible dynamic beta offsets is based on determining the semi-static beta offset.

9. An apparatus for wireless communication, comprising:
a transceiver;
a memory configured to store instructions; and
one or more processors communicatively coupled with the transceiver and the memory, wherein the one or more processors are configured to:
receive a configuration indicating a set of multiple possible dynamic beta offsets;
receive downlink control information indicating a resource grant for shared channel resources, wherein the downlink control information does not include at least an indication of selection of a dynamic beta offset;
generate, based on receiving the downlink control information without the indication of selection of the dynamic beta offset, a shared data channel including uplink control information using a first one in the set of multiple possible dynamic beta offsets; and
transmit the shared data channel over the shared data channel resources.

10. The apparatus of claim 9, wherein the set of multiple possible dynamic beta offsets are indicated in a table having associated indices, and wherein the one or more processors are configured to generate the shared data channel includes using one in the set of multiple possible dynamic beta offsets having a lowest index in the table.

11. The apparatus of claim 9, wherein the one or more processors are further configured to determine that the downlink control information does not include at least the indication of selection of the dynamic beta offset based at least in part on determining a format of the downlink control information.

12. The apparatus of claim 9, wherein the one or more processors are further configured to receive a configuration indicating a set of multiple possible dynamic beta offsets and a semi-static beta offset, wherein the one or more processors are configured to use the first one in the set of multiple possible dynamic beta offsets based on determining the semi-static beta offset.

13. An apparatus for wireless communication, comprising:
a transceiver;
a memory configured to store instructions; and
one or more processors communicatively coupled with the transceiver and the memory, wherein the one or more processors are configured to:
transmit, to a user equipment (UE), a configuration indicating a set of multiple possible dynamic beta offsets; and
receive, from the UE, over shared channel resources, and where a downlink control information indicating a resource grant for the shared channel resources does not include at least an indication of selection of a dynamic beta offset, a shared data channel including uplink control information using a first one in the set of multiple possible dynamic beta offsets.

14. The apparatus of claim 13, wherein the set of multiple possible dynamic beta offsets are indicated in a table having associated indices, and wherein the one or more processors are configured to receive the shared data channel includes using one in the set of multiple possible dynamic beta offsets having a lowest index in the table.

15. The apparatus of claim 13, wherein the one or more processors are further configured to determine that the downlink control information does not include at least the indication of selection of the dynamic beta offset based at least in part on determining a format of the downlink control information.

16. The apparatus of claim 13, wherein the one or more processors are further configured to transmit a configuration indicating a set of multiple possible dynamic beta offsets and a semi-static beta offset, wherein the one or more processors are configured to use the first one in the set of multiple possible dynamic beta offsets based on determining the semi-static beta offset.

* * * * *